CODE GENERATOR

Filed May 9, 1958

INVENTOR
R. P. JAEGER

BY Harry C. Hart

ATTORNEY

United States Patent Office 2,957,952

Patented Oct. 25, 1960

2,957,952

CODE GENERATOR

Robert P. Jaeger, Berkeley Heights, N.J., assignor to Bell Telephone Laboratories, Incorporated, New York, N.Y., a corporation of New York Filed May 9, 1958, Ser. No. 734,218

14 Claims. (Cl. 179—90)

Figures 1, 2, 3:
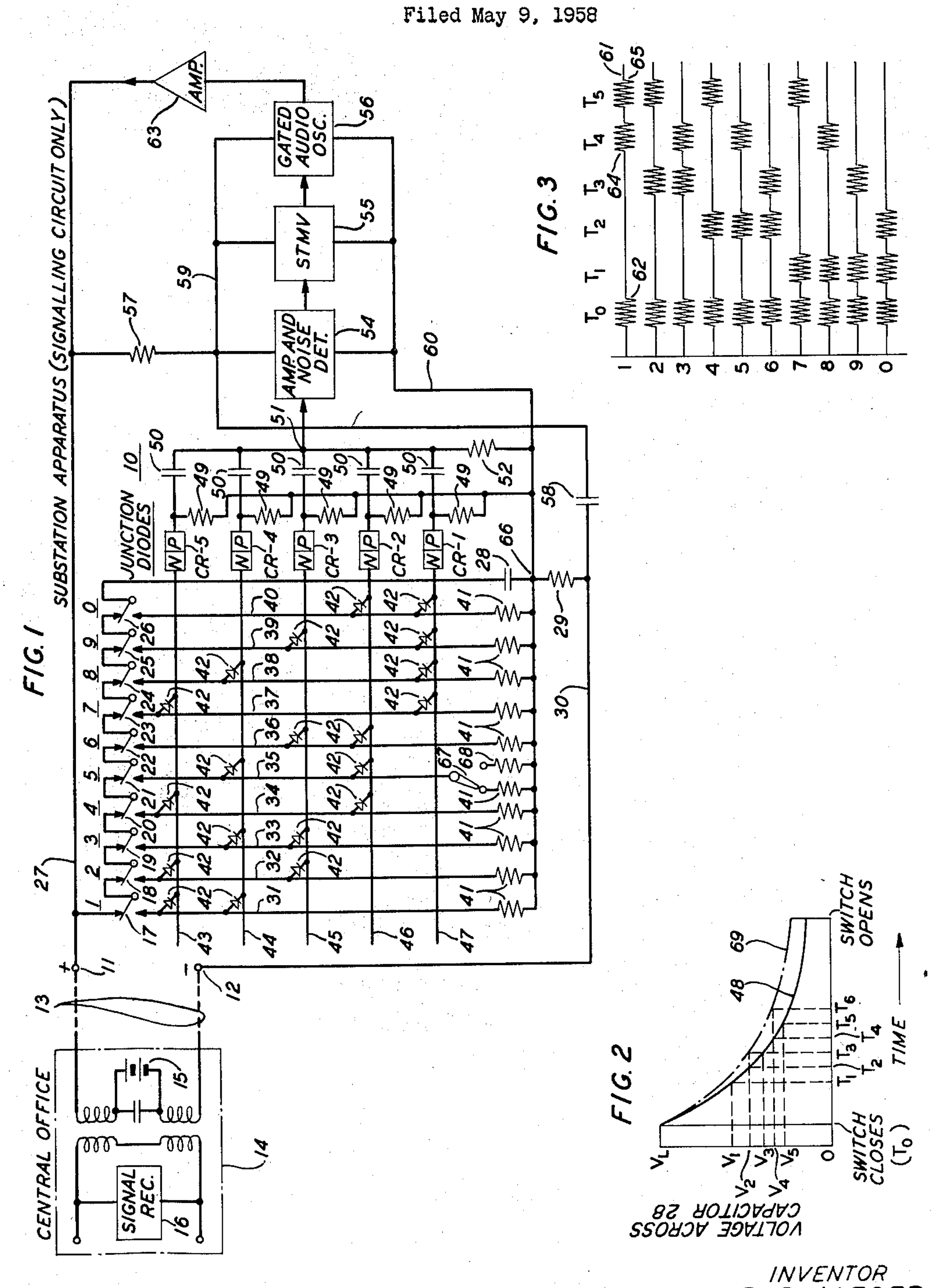

This invention relates to code generation and, more particularly, to the generation of signaling or calling codes for control of telephone switching apparatus.

The advantages of extremely high speed operation, large information storage capacity with rapid access, coupled with the elimination of the difficulties of maintenance of mechanical switching elements, are all demonstrated by the electronic switching telephone system disclosed in the copending patent application of W. A. Budlong et al., Serial No. 688,386, filed October 7, 1957. In order to utilize such systems to the fullest advantage, it is essential that the subscriber apparatus, including in particular the call transmitter, be compatible in terms of supplying digital information in a form which is readily acceptable by the switching system and, equally important, to supply the information at a rate comparable to the operating speed of the system. The conventional rotary dial, with its pulsing rate of ten to twelve pulses per second plus the interdigital time imposed by the windup operation imposes a severe speed restriction upon such a switching system. Indeed, the dial pulse rate is an order of magnitude slower than the normal line scanning rate of the switching system.

One proposal to overcome such a disparity in the calling signal generation and utilization speed is disclosed in the copending application of L. A. Meacham, Serial No. 469,802, filed November 18, 1954, since matured into U.S. Patent 2,824,173, issued February 18, 1958. That application involves signaling by means of decaying tones sent over the line, with a particular frequency assigned to each digit. While the time required for such a transmission is exceedingly small, the frequencies thus designated all necessarily fall within the voice frequency range to insure satisfactory transmission. Noise or speech picked up by the transmitter at the calling station may therefore contain the frequencies used for signaling and may cause a false digit to be registered or may mask a correct digit.

The prevention of such interference, termed "talkoff" protection, may be accomplished by employing such circuit arrangements as are disclosed in the copending application of L. A. Meacham et al. Serial No. 743,434, filed June 20, 1958. It is more desirable, however, to avoid the added complexity of such circuit arrangements by employing a signaling system which does not require such protection, provided the signaling speed is compatible with electronic switching systems.

It is an object of the present invention to signal telephone calling information at speeds limited only by the subscriber's ability to manipulate the calling device.

It is another object of the invention to transmit telephone calling information by means having an inherently low sensitivity to noise and speech signal interference.

It is a more specific object of the invention to utilize serially coded tone bursts to signal telephone calling information.

It is still another object of the invention to accomplish such signaling with a minimum of complexity and physical bulk in the subscriber set.

These and other objects are accomplished in accordance with a specific embodiment of the present invention by utilizing a series of manually operated pushbuttons to initiate a decaying ramp voltage. By means of a steering matrix, this ramp voltage is applied to selected ones of a plurality of semiconductor diodes each having a reverse voltage breakdown characteristic commonly known as a "Zener" characteristic. Such a diode conducts in the reverse direction upon the application of a voltage exceeding a critical breakdown voltage. Accompanying the breakdown of many such diodes is a burst of noise which is transient in nature and which continues only while the diode is breaking down.

In the present invention, the Zener diodes are chosen to have noisy breakdown voltages which differ from each other by fixed increments. The ramp voltage therefore breaks down the selected Zener diodes at different times. The noise voltage generated by each of these breakdowns is detected and used to gate a voice frequency oscillator. In this way serial code groups of output pulses are formed which identify the particular pushbutton which has been operated.

One feature of the invention resides in the use of a redundant code pattern, such as a two-out-of-five code, to encode the signaling information and thus to reduce or substantially eliminate the possibility of erroneous signaling information being received due to noise and speech signals.

Another feature of the invention resides in the utilization of the noise characteristics of Zener breakdown diodes, a characteristic normally found to be undesirable and to be avoided if possible.

Yet another feature of the invention resides in the common use of the same circuit elements, which serve individually to generate the code digits, to generate a marking digit at the beginning of each code pulse group.

The advantages of the present invention over presently known signaling systems is to be found in the simple, small and rugged circuit arrangements which make possible rapid, substantially error-free signaling.

These and other objects and features, the nature of the present invention and its various advantages, will appear more fully upon consideration of the attached drawing and of the following detailed description of the drawing.

In the drawing:

Fig. 1 is a schematic representation of a telephone signaling system in accordance with the present invention;

Fig. 2, given for the purposes of illustration, is a graphical and qualitative representation of the ramp voltage characteristic derived in the circuit of Fig. 1; and Fig. 3, given for the purposes of illustration, is a graphical representation of the two-out-of-five serial code groups utilized in the arrangements of the invention.

Referring now to Fig. 1, there is shown a telephone call signaling system in accordance with the present invention comprising substation apparatus 10 having terminals 11 and 12. Transmission line 13 serves to connect terminals 11 and 12 to a central office 14 which includes a source 15 of direct current and a signaling receiver 16, Only the signal path portion of the substation apparatus has been illustrated. The voice path portion of this apparatus has not been illustrated since it may take any one of many forms known in the art, and, furthermore, constitutes no part of the present invention.

Included in substation apparatus 10 are ten single pole double throw switches identified by the numerals 17 through 26. Switches 17 through 26 may be operated manually by any well-known means such as, for example, spring-loaded push-buttons. Switches 17 through 26 are indexed according to the decimal digits "0" through "9" in accordance with common telephone practice. The upper contact of switch 17 is connected directly to lead 27 which is supplied by way of transmission line 13 with a positive voltage from battery 15 in central office 14. The upper contact of each of the succeeding switches is connected to the armature of the immediately preceding switch. The armature of the last switch, switch 26, is connected through a capacitor 28 and a resistor 29 to lead 30 which is connected by way of transmission line 13 to the negative terminal of battery 15 in central office 14. It can thus be seen that when all of the switches 17 through 26 are in the non-operated (up) condition, the entire voltage of battery 15 appears directly across capacitor 28.

The lower contact of each of the switches 17 through 26 is connected to a respective one of ten vertical conductors 31 through 40, which vertical conductors are connected through substantially like resistors 41 to point 66 between capacitor 28 and resistor 29. Vertical conductor 35 is connected to resistor 41 through a switch 67 which may be operated to connect conductor 35 to resistor 68. The function of switch 67 and resistor 58 will be described more fully below. It can be seen that when any one of the switches 17 through 26 is operated, the voltage on capacitor 28 is discharged by way of the lower contact of the switch, the associated vertical conductor and one of the resistors 41.

In Fig. 2 there is shown a graphical and qualitative representation of the voltage waveform 48 appearing across any one of the resistors 41 upon the operation of the corresponding one of switches 17 through 26. At the time $T_0$, when the switch closes, the voltage across resistor 41 immediately rises from zero to the full line voltage illustrated in Fig. 2 as $V_L$. Immediately after the closing of the switch, the voltage across resistor 41 begins to decay exponentially until at a time $T_5$, it has reached a value $V_5$. Thereafter, it continues to decay until such a time as the operated one of switches 17 through 26 is opened. At that time, the voltage across resistor 41 immediately drops to zero. The waveform described above and illustrated in Fig. 2 can be termed a "ramp voltage" and will be referred to hereinafter as such.

While a decaying ramp voltage has been illustrated in Fig. 2, for many purposes a rising ramp voltage would serve equally well. In either case, however, it is essential that the voltage waveform have a monotonic form, that is, have a slope which does not change its sign. In this way the sequence of operations to be described below may be most easily carried out.

It should be further noted that the intervals between times $T_1$, $T_2$, $T_3$, $T_4$, and $T_5$ are preferably all substantially equal in duration. This may be achieved by selecting only a small portion of curve 48 to operate on, in which case the slope is substantially linear, or by selecting the breakdown voltages $V_1$ through $V_5$ such that they are related exponentially, in which case the time intervals may be linear while the slope is exponential. This latter situation has been illustrated in Fig. 2.

Returning to Fig. 1, each of the vertical conductors 31 through 40 is coupled by means of the various diodes 42 to selected ones of five horizontal conductors 43 through 47. The connections of the diodes 42 are chosen to form a coding matrix in which a signal on any one of the vertical conductors 31 through 40 is converted into a permutation code group of signals on the horizontal conductors 43 through 47 identifying that particular one of the vertical conductors 31 through 40, The code chosen for the particular embodiment illustrated is a conventional two-out-of-five code in which case vertical conductor 31 is coupled to horizontal conductors 43 and 44, vertical conductor 32 is coupled to horizontal conductors 43 and 45, and so forth, in the manner illustrated. The resulting signals on horizontal conductors 43 through 47 are therefore permutation code representations of the decimal digits associated with switches 17 through 26.

In accordance with the present invention, a junction diode is connected to each one of the horizontal conductors 43 through 47. Thus, junction diode CR–1 is connected to horizontal conductor 47, junction diode CR–2 is connected to horizontal conductor 46 and so on to junction diode CR–5 which is connected to horizontal conductor 43. The junction diodes CR–1 through CR–5 each comprise an integral body of semiconductive material having two regions of opposite conductivity type, i.e., p-type and n-type, separated by a narrow zone of transition from material of one conductivity type to material of the opposite conductivity type. Semiconductor devices of this type have asymmetrically conducting properties associated wtih the behavior at the junction between the p-type and n-type materials and have come to be known as p-n junction diodes.

The p-n junction diodes have come to be known for a unique property first disclosed in W. Shockley Patent 2,714,702 dated August 5, 1955. In the reverse conduction characteristic of the diodes, there is a region of substantially constant voltage over a wide range of currents. Important advantages of this property are that the break in the reverse conduction characteristic from a very high resistance to a low incremental resistance at nearly constant voltage is very sharp and that the critical reverse voltage at which the characteristic breaks is very stable both with light and with temperature variations. Further, this critical voltage at the "knee" of the characteristic may be predicted and by a proper design may be obtained at any desired voltage over a range. Semiconductor devices of this type are commonly known as Zener diodes since, at one time, it was thought that this unique characteristic was due to an effect similar to the breakdown in insulators described by Zener. Although other theories have since been advanced, this name has persisted. Diodes of this type are described in an article by F. H. Chase et al. entitled, "Transistors and Junction Diodes in Telephone Power Plants," appearing in the Bell System Technical Journal for July 1954, vol. 33, page 827.

In many p-n junction or Zener diodes, the reverse conduction characteristic is very noisy at the reverse conduction "knee". One example of this type of Zener diode is the silicon p-n junction alloy diode described in an article entitled, "Silicon P–N Junction Alloy Diodes" by G. L. Pearson and B. Sawyer in the Proceedings of the Institute of Radio Engineers for November 1952, vol. 40, page 1348. The term "breakdown" has been associated with the reverse conduction "knee" because at a critical voltage the characteristic of a diode changes abruptly from that of a high resistance device to that of a low resistance device.

In the embodiment of the invention illustrated in Fig. 1, the junction diodes CR–1 through CR–5 are of the above-described noisy breakdown type. Furthermore, each of these diodes has a critical breakdown voltage which differs from that of all of the other junction diodes. Thus, junction diode CR–1 breaks down at a voltage $V_1$, diode CR–2 at a voltage $V_2$, diode CR–3 at a voltage $V_3$, diode CR–4 at a voltage $V_4$ and diode CR–5 at a voltage $V_5$. The voltage increments between these breakdown voltages are as described above and the highest one of these breakdown voltages is substantially less than the line voltage $V_L$. This is illustrated more clearly along the vertical axis of the graph of Fig. 2.

As shown in Figs. 1 and 2, the operation of any one of the switches 17 through 26 serves to apply the ramp voltage illustrated in Fig. 2 to two of the five horizontal conductors 43 through 47 at time $T_0$. The two connected junction diodes both break down immediately and go into a low resistance condition. At some later time, for example, $T_1$, the ramp voltage 48 drops to the breakdown voltage of a particular junction diode, for example $V_1$, at which time that diode goes back into the high resistance condition. At a still later time, e.g., $T_2$, the ramp voltage has fallen to the breakdown voltage of another diode, for example, $V_2$.

Associated with each of these transitions between the high resistance condition and the low resistance condition is a burst of noise, i.e., a random transistory voltage fluctuation as described above. Coupling capacitors 50 serve to convey these noise bursts to common junction point 51 and to block the slower fluctuations associated with the ramp voltage. Padding resistors 49 may be employed to correct minor discrepancies in the breakdown voltages of junction diodes CR–1 through CR–5 so as to cause them to break down at the desired times. Resistor 52 serves as a return path for the noise burst and in combination with capacitors 50, forms a high pass filter for the noise signals.

The voltage variations appearing at junction point 51 are introduced into an amplifying and noise detecting circuit 54, the output of which is used to trigger a single-trip multivibrator 55. The output of multivibrator 55, in turn, enables a gated voice frequency oscillator 56. The function of circuits 54, 55 and 56 is to detect the individual noise bursts associated with the breakdown of diodes CR–1 through CR–5, to utilize those detected noise signals to generate pulses of uniform height and width and to utilize these uniform pulses to gate, i.e., enable, an audio frequency oscillator. These circuits may comprise transistor arrangements of well-known configurations obtaining electrode voltages between conductors 59 and 60 and will not be described in detail here. Any other circuit arrangements performing these functions would be equally suitable.

A resistor 57 and a capacitor 58 serve to stabilize the electrode voltages of the transistor circuits against undesired variations with line voltage appearing across terminals 11 and 12. Capacitor 58 also serves to bypass AC signals such as voice currents around the signaling transmitter illustrated in Fig. 1. The output of oscillator 56 is amplified by transmitting amplifier 63, applied to lead 27, and is transmitted, by way of telephone line 13, to central office 14 where it is detected and decoded in signal receiver 16.

Resistor 29, connected in series with capacitor 28 across the line, is of low value and serves to dampen the switching transients which might otherwise occur when one of the switches 17 through 26 is released after being operated. Furthermore, this resistor provides a sharp drop in the voltage on lead 60 when any one of the switches 17 through 26 is released, thereby momentarily locking circuits 54, 55 and 56 out of operation.

The operation of the signaling circuit of Fig. 1 can be better understood by considering the waveforms shown in Fig. 3. Fig. 3 illustrates the outputs of oscillator 56 when each of the switches 17 through 26 is operated. Thus, waveform 61 illustrates the signaling output when switch 17 is operated. At time $T_0$, when switch 17 is initially operated, a ramp voltage of the form shown in Fig. 2 is developed across resistor 41 connected to vertical conductor 31. Since vertical conductor 31 is coupled to horizontal conductors 43 and 44 through diodes 42, this ramp voltage is applied to junction diodes CR–5 and CR–4. The initial rise in the ramp voltage reverse biases these two junction diodes and is sufficient to break both of them down. The noise voltage associated with these breakdowns is utilized by amplifier and noise detecting circuit 54 and multivibrator 55 to gate oscillator 56. A marking pulse 62 of audio frequency tone therefore occurs at time $T_0$ as shown in Fig. 3, is amplified by amplifier 63, and is transmitted to central office 14. The function of marking pulse 62 is to indicate to the receiver 16 that a code pulse group is to follow. Such a marking pulse is essential in a system utilizing manually-operated push-buttons where code pulse groups are initiated randomly.

As the ramp voltage continues to decay, it reaches the voltage $V_4$ at time $T_4$, at which time junction diode CR–4 goes back into a high resistance condition. This transition is also accompanied by a noise burst which is also used to gate oscillator 56 and to transmit a second pulse 64 of audio frequency tone at time $T_4$.

The ramp voltage continues to decay until it reaches the voltage $V_5$, at which time diode CR–5 goes back into the high resistance condition. The accompanying noise burst is employed to gate oscillator 56 a third time to produce tone burst 65 at time $T_5$. The resulting waveform 61 is a two-out-of-five permutation code representation of the decimal digit "1" in which the code group is formed by means of serial tone bursts.

Fig. 3 illustrates the manner in which the remainder of the decimal digits are encoded using the same two-out-of-five permutation code. The operation of the circuit of Fig. 1 is similar for all of these encoding processes except for the fact that the operation of the different switches 17 through 26 places different ones of the junction diodes CR–1 through CR–5 in the circuit to form the necessary permutations.

If it is desired to provide additional signaling information such as, for example, beginning and end-of-dialing signals, the coding technique illustrated in Fig. 1 can be expanded to accommodate code groups with a larger number of digits simply by adding additional switches and Zener diodes. In this way a two-out-of-six code, a two-out-of-seven code, or any other code may be obtained.

In order to generate these larger code groups with a minimum of added circuitry, the additional digits can be obtained by changing the value of any one or more of the discharge resistors rather than by adding switches and Zener diodes. For the purposes of illustration, a switch 67 is shown in Fig. 1 for this purpose. Switch 67 serves to connect vertical conductor 35 to resistor 68 rather than to resistor 41, where resistor 68 has a substantially different value of resistance than resistors 41. More particularly, the value of resistor 68, and hence the slope of the ramp voltage, is chosen to place the breakdowns of connected diodes CR–2 and CR–4 in different time slots than they occur with resistor 41 in the circuit. The new ramp voltage, shown by dashed curve 69 in Fig. 2 therefore intercepts the breakdown voltage of diode CR–2 at time $T_3$, instead of at $T_2$, and intercepts the breakdown voltage of diode CR–4 at a new time slot $T_6$, immediately following $T_5$, rather than at $T_4$. In this way a six digit code group is obtained with the same five breakdown diodes which are used to form the five digit code groups.

The six digit code group may also be obtained by utilizing Zener diodes to "break" the slope of the ramp voltage. If such a diode is placed across a portion of the discharge resistance, this portion will be shorted out of the discharge path as long as the diode continues to conduct. During this interval, the ramp voltage will have a first slope which may be chosen to intercept the breakdown voltage of one of diodes CR–1 through CR–5, for example, diode CR–2, at one time, e.g., $T_2$. When the voltage across this diode falls below the breakdown value, however, this diode will cease to conduct. The shorted portion of the discharge resistance will then be introduced into the discharge path and will change or "break" the slope of the ramp voltage. The new slope may be chosen to intercept the breakdown voltage of another Zener diode, for example, diode CR–5, at a second time, e.g., $T_6$. In this way code groups with additional digits may be provided with the same number of Zener diodes.

The duration of each of the tone bursts need only be on the order of a few milliseconds and the duration of the entire code pulse group may be less than fifty milliseconds. Since the code pulse groups are formed so rapidly, the only significant limitation on the speed of the signaling system is the subscriber's ability to operate successive switches. To insure complete formation of the code groups, however, switches 17 through 26 are provided with a sufficient amount of mechanical hangover to prevent opening again in less than fifty milliseconds.

The frequency of audio oscillator 56 may be anywhere in the voice frequency band, for example, 2600 cycles per second, to insure transmission over voice transmission facilities. The length of each tone burst, as determined by multivibrator 55, is adjusted to cover at least several cycles of the voice frequency in order that the tone bursts may be economically received and detected.

The large amount of redundancy inherent in the two-out-of-five code insures a very low error rate in the transmission of signaling information, particularly errors which result in acceptable but incorrect digits. This aspect is important in telephone communications where an error in any single digit can result in a wrong number.

If the amplifier and detector 54, the multivibrator 55, oscillator 56 and amplifier 57 all employ transistors as the active elements, two advantages are obtained. First, the electrode voltages can be derived directly from the telephone line, making local power sources unnecessary. Secondly, the circuits can be sufficiently miniaturized to fit directly in the base of the telephone subset. In large telephone installations, these two advantages are very important economically.

The above-described arrangements are merely illustrative of the many other arrangements which could represent applications of the principles of the invention. Such other arrangements can readily be devised by those skilled in the art without departing from the spirit or the scope of the invention.

What is claimed is:

1. Code generating means which comprises a plurality of switching means corresponding to the decimal digits, means including said switching means for providing a decaying ramp voltage, means responsive to the operation of any one of said switching means for applying said ramp voltage to selected conductors of a group of conductors corresponding to the digits of a binary code, a voltage breakdown device connected to each of said conductors, said several breakdown devices having breakdown voltages corresponding to the digit positions of said binary code, means for detecting the breakdowns of said devices, and means responsive to said detecting means for generating serial code pulses.

2. Code generating means according to claim 1 in which each of said voltage breakdown devices comprises a body of semiconductor material having two regions of opposite conductivity type.

3. Code generating means according to claim 1 in which each of said voltage breakdown devices comprises a p-n junction semiconductor diode providing a noise output in the breakdown region, and in which said detecting means comprises means for detecting said noise output.

4. Code generating means according to claim 1 including normally disabled oscillation means and means for applying said serial code pulses to enable said oscillation means.

5. Code generating means according to claim 1 including means for varying the slope of said decaying ramp voltage.

6. Means for translating decaying voltages representative of binary code groups of pulses appearing on a plurality of parallel conductors to voltages representative of equivalent serial binary code groups on a single conductor, which translating means comprises a plurality of voltage responsive elements, said elements each being responsive to a voltage amplitude substantially proportional to one of the digit time positions of said serial binary code to produce distinctive voltage outputs, one of said elements being connected to each of said parallel conductors, and means for applying the outputs of said elements to said single conductor.

7. A parallel-to-serial code translator which comprises a plurality of parallel conductors, means for representing the digits of a parallel binary code group on said parallel conductors as monotonically varying voltages, a voltage breakdown device connected to each of said conductors, said several breakdown devices having breakdown voltages proportional to the time positions of the several digits of a serial binary code pulse group, and means for detecting the breakdowns of said devices.

8. A code translator according to claim 7 wherein said voltage breakdown devices comprise semiconductor junction diodes and said detecting means comprises a noise detector.

9. Signal generating means which comprises means for applying a decaying ramp voltage to any one of a plurality of input conductors, means for connecting each of said input conductors to selected ones of a lesser plurality of coding conductors to form permutation code pulse groups identifying each of said input conductors, a p-n junction diode connected to each of said coding conductors, the several ones of said diodes having reverse breakdown voltages corresponding to the digit positions of said permutation code groups, and means for detecting the breakdowns of said diodes.

10. In a telephone system, a signaling code generator which comprises a plurality of switches corresponding to the decimal digits, means responsive to the operation of any one of said switches for initiating a monotonically varying voltage waveform and applying said waveform to selected ones of a plurality of conductors in accordance with a binary code, a plurality of semiconductor junction diodes having breakdown voltages corresponding to the digit positions of said binary code, means for connecting said diodes to said conductors, and means for detecting the breakdowns of said diodes.

11. The combination according to claim 10 further including pulse generating means for producing gating pulses of uniform amplitude and duration, said pulse generating means being responsive to the output of said detecting means, normally disabled voice frequency oscillation means, and means for enabling said oscillation means in response to said gating pulses.

12. In a telephone system including a central office having a signaling receiver, station apparatus, and a transmission line connecting said central office and said station apparatus, a signaling transmitter comprising a plurality of push-button switches indexed according to the decimal digits, means responsive to the operation of any one of said switches for generating a decaying ramp voltage and applying said ramp voltage to a corresponding one of a plurality of decimal digit conductors, a coding matrix for translating signals on any one of said decimal digit conductors to a selected two-out-of-five binary digit conductors, a semiconductor junction diode having a noisy breakdown characteristic connected to each of said five binary digit conductors, each of said several diodes having a reverse conduction breakdown voltage corresponding to one of the digit positions of a five digit binary code, noise detecting means responsive to the breakdown of any of said diodes for producing triggering pulses, means responsive to said triggering pulses for producing gating pulses of uniform amplitude and duration, normally inhibited audio frequency oscillation means, means responsive to said gating pulses for enabling said oscillation means, and means for applying the output of said oscillation means to said transmission line whereby said output is transmitted to said central office and received by said signaling receiver.

13. The combination according to claim 12 in which said push-button switches are connected in series with a capacitive impedance element across said transmission line, and in which a dissipative impedance element is connected to each of said decimal digit conductors.

14. The combination according to claim 12 including means for changing the slope of said ramp voltage whereby additional pulse code groups may be generated by the operation of said push-button switches.

References Cited in the file of this patent

UNITED STATES PATENTS

| | | |
|---|---|---|
| 2,060,184 | Dimond | Nov. 10, 1936 |
| 2,433,836 | Bowne | Jan. 6, 1948 |
| 2,576,099 | Bray | Nov. 27, 1951 |
| 2,607,891 | Townsend | Aug. 19, 1952 |
| 2,681,386 | Davison | June 15, 1954 |